United States Patent
Rublee

(10) Patent No.: US 7,471,299 B2
(45) Date of Patent: *Dec. 30, 2008

(54) COMPOSITING GRAPHICAL OBJECTS

(75) Inventor: Craig D. Rublee, Aptos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 11/479,110

(22) Filed: Jun. 30, 2006

(65) Prior Publication Data

US 2006/0244756 A1    Nov. 2, 2006

Related U.S. Application Data

(63) Continuation of application No. 10/071,660, filed on Feb. 8, 2002, now Pat. No. 7,079,151.

(51) Int. Cl.
*G09G 5/02* (2006.01)
*G09G 5/00* (2006.01)

(52) U.S. Cl. ............................ 345/589; 345/629

(58) Field of Classification Search ................ 345/589, 345/611–617, 619, 629, 634–641
See application file for complete search history.

(56) References Cited

U.S. PATENT DOCUMENTS

| | | | |
|---|---|---|---|
| 4,941,182 A | 7/1990 | Patel | 382/141 |
| 4,952,051 A | 8/1990 | Lovell et al. | 352/87 |
| 5,063,375 A | 11/1991 | Lien et al. | 345/616 |
| 5,113,251 A | 5/1992 | Ichiyanagi et al. | 358/500 |
| 5,142,616 A | 8/1992 | Kellas et al. | 345/634 |
| 5,239,383 A | 8/1993 | Ikeda et al. | 358/300 |
| 5,388,206 A | 2/1995 | Poulton et al. | 345/505 |
| 5,542,052 A | 7/1996 | Deutsch et al. | 345/589 |
| 5,710,839 A | 1/1998 | Cok | 382/264 |
| 5,812,214 A | 9/1998 | Miller | 348/587 |
| 5,872,902 A | 2/1999 | Kuchkuda et al. | 345/615 |
| 5,900,953 A | 5/1999 | Bottou et al. | 358/540 |
| 6,148,102 A | 11/2000 | Stolin | 382/164 |
| 6,208,386 B1 | 3/2001 | Wilf et al. | 348/578 |
| 6,515,675 B1 | 2/2003 | Bourdev | 345/629 |

FOREIGN PATENT DOCUMENTS

EP    0 771 107 B1    5/1997

OTHER PUBLICATIONS

Glenn Fleishman, Technology Spotlight *"The Squeeze Is On" Using the right kind of compression can save you time and space*; Adobe Magazine, Summer 1998, pp. 35-37.
Smith and Blinn, "Blue Screen Matting," Computer Graphics Proceedings, Annual Conference Series, pp. 259-268, 1996.
Rosenfield et al. "Digital Picture Processing", Digital Picture Processing, Orlando, Academic Press, US, vol. 1, 1982, p. 6 XP002246743, Section 7.2, "Inverse Filtering", pp. 276-281.

*Primary Examiner*—Ryan R Yang
(74) *Attorney, Agent, or Firm*—Fish & Richardson P.C.

(57) ABSTRACT

Systems, computer-implemented methods and apparatus, including computer program apparatus, implementing techniques for rendering an image. A target area is identified in the image and a set of pixels to sample is selected from the target area to sample. An attribute value is identified for each of a plurality of the pixels in the selected set, and an attribute value is predicted for the target area based on the identified attribute value. At least a portion of the foreground area can be rendered based on the predicted attribute value. A statistical sampling analysis can be used to predict a background color when rendering a foreground area of an image.

13 Claims, 3 Drawing Sheets

FIG._1

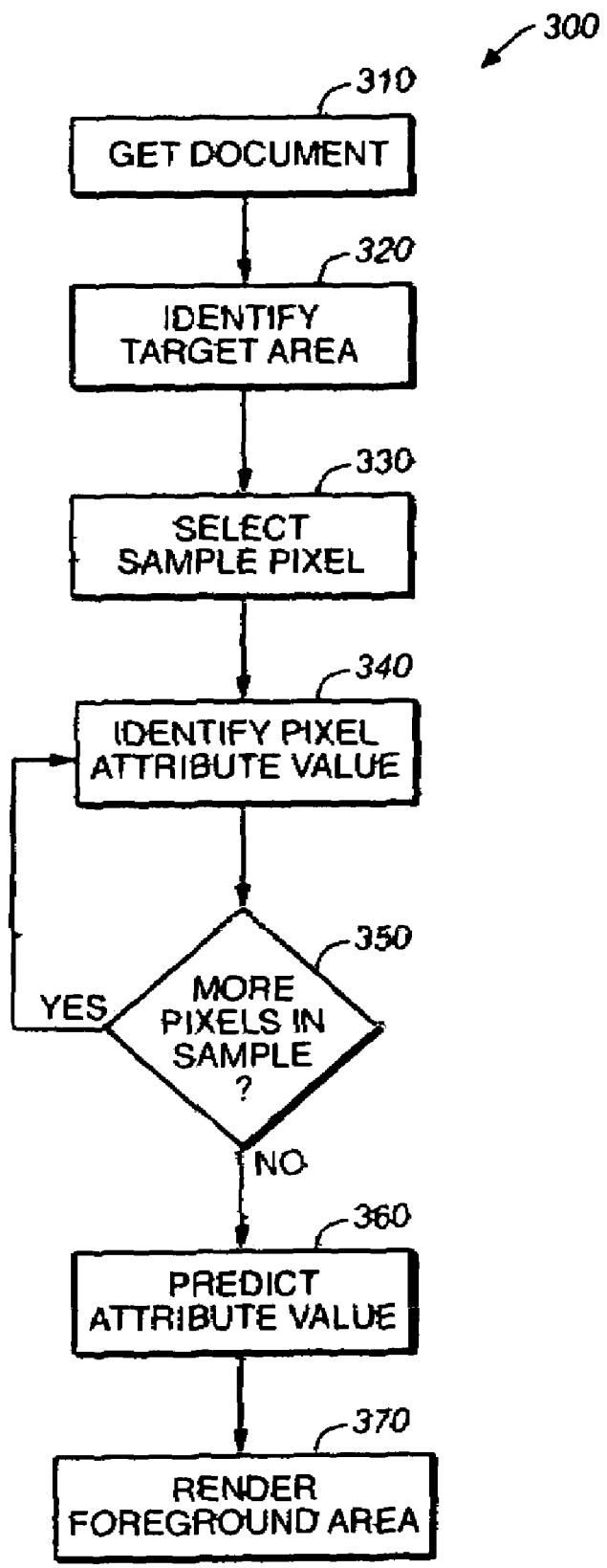
FIG._3

COMPOSITING GRAPHICAL OBJECTS

CROSS-REFERENCE TO RELATED APPLICATIONS

This application is a continuation application of, and claims priority to, U.S. patent application Ser. No. 10/071,660, entitled Compositing Graphical Objects, to inventor Craig D. Rublee, which was filed on Feb. 8, 2002 now U.S. Pat. No. 7,079,151. The disclosure of the above application is incorporated herein by reference in its entirety.

BACKGROUND

The invention relates to computer-implemented methods for rendering electronic documents.

Many graphics or imaging processing computer programs, such as Adobe® Photoshop®, available from Adobe Systems Incorporated, of San Jose, Calif., build a final image by compositing two or more graphical objects together. The graphical objects on an electronic document can be thought of as forming a stack, where the stacking order is defined to be the order in which the graphical objects are specified, typically bottommost object first. The graphical objects can be represented by an array of pixels or analytically, e.g., by using shape outlines, or by other functions which map positions to data values. Each pixel has a color value (which can include multiple colorant values) representing a color. For example, a color in RGB color space includes three colorant values: one for each red, green, and blue. Likewise a color value in CMYK color space may include four colorant values: one for each cyan, magenta, yellow, and key (black). Each pixel can optionally also have an alpha value which represents the transparency of the pixel, with an alpha value of 0 representing a pixel that is completely transparent and an alpha value of 1 representing a pixel that is opaque.

In an opaque imaging model (i.e., with no transparency), the color of the page at any point is defined to be the color of the topmost object at that point, disregarding any overlapping objects that fall below that object in the stack. This effect can be realized by defining a painting order (that describes the sequence of placing the graphical objects in an image) in which the objects are simply rasterized directly onto the page in the order that they are specified. Objects that are earlier in the painting order appear in the background behind objects later in the order. By contrast, in a transparency imaging model, object transparency is taken into account, such that all of the objects in the stack can potentially contribute to the result. At any given point, the color of a given image location or pixel is determined by combining the colors of all objects that include the location or pixel as a function of the transparency of those objects.

In addition to these rendering rules, anti-aliasing algorithms can be used when rendering a foreground graphical object. Anti-aliasing can smooth out displayed or printed text. In the printing process when rasterizing an object (including text and non-text objects) having a foreground color to a background within a frame buffer for display or printing, it can be important to know the background color as it may determine the anti-aliasing algorithm to use. For example, if the background is white, then an anti-aliasing algorithm can be used that is optimized for drawing foreground objects on a white background. Additionally, if the background color is known, then it is possible for the anti-aliasing algorithm to pre-blend the edge pixels of the foreground object with a color similar to (or the same as) that of the background color. Once the edge pixels of the foreground object are pre-blended, an opaque-imaging model can be used and the foreground object can be directly rendered onto the background.

SUMMARY

The invention provides systems, methods and apparatus, including computer program apparatus, for rendering a foreground area of an image based on a predicted attribute value of a background.

In general, in one aspect, the invention features systems, computer-implemented methods and apparatus, including computer program apparatus, implementing techniques for rendering a foreground area of an image that includes a foreground area and a background. The techniques include identifying a target area in the image, selecting a set of pixels to sample from the target area, identifying an attribute value for each of a plurality of the pixels in the selected set, predicting an attribute value for the target area based on the identified attribute value, and rendering at least a portion of the foreground area based on the predicted attribute value. The target area is an area of the background associated with the foreground area or an area of the foreground area associated with an area of the background. The target area contains a number of pixels. Each pixel has one or more attribute values associated with one or more attributes. The selected set of pixels includes less than the number of pixels in the target area.

Particular implementations can include one or more of the following features. The one or more attributes can include a color attribute. Identifying the attribute value for each of a plurality of the pixels in the selected set can include determining whether the identified attribute value matches a predetermined attribute value. Determining whether the attribute value of each of the plurality of pixels matches a predetermined attribute value can include comparing the attribute value of each of the plurality of pixels to a set of attribute values within a threshold distance from the predetermined attribute value. Selecting a set of pixels to sample can include defining a desired confidence level for the prediction of an attribute value for the pixels of one or more of the foreground area and the background. The set of pixels to sample can be selected by defining a sample size based on an allowable percentage of pixels that do not match the predetermined attribute value and the desired confidence level, and selecting a number of pixels from the target area based on the sample size. The set of pixels can be randomly selected from the target area. The one or more attributes can include a transparency attribute. Rendering the foreground area can include applying a rendering function based on the predicted attribute value. The plurality of rendering functions can include a first rendering function for rendering foreground areas associated with background areas having a pre-determined attribute value. Rendering the foreground area can include applying the first rendering function if the predicted value matches the pre-determined attribute value. Rendering the foreground area can include applying a second rendering function if the predicted value does not match the pre-determined attribute value.

In general, in another aspect, the invention features systems, computer-implemented methods and apparatus, including computer program apparatus, implementing techniques for rendering a foreground area of an image that includes a foreground area and an associated background area that includes a number of pixels. The techniques include identifying a target area in the image, selecting a set of pixels to sample from the background area, identifying a color of a plurality of pixels in the selected set, predicting a color of the background area based on the identified color, and based on the predicted color of the background area, selecting a rendering function from a plurality of rendering functions, and rendering at least a portion of the foreground area using the selected rendering function. The target area is an area of the background associated with the foreground area or an area of the foreground area associated with an area of the background. The target area contains a number of pixels. Each pixel has one or more attribute values associated with one or more attributes. The selected set of pixels includes less than the number of pixels in the target area. The plurality of rendering functions include a first rendering function for rendering foreground areas associated with background areas having a pre-determined background color, and a second rendering function for rendering foreground areas not associated with background areas having the pre-determined background color.

Advantages that can be seen in implementations of the invention can include one or more of the following. Reducing the number of pixels that have to be examined decreases the time it takes to determine the background color (or foreground opacity) of—and hence to render—an image. In a case where the exact result for the background color (or foreground opacity) is not required, the invention uses statistical sampling of pixels to predict the background color (or foreground opacity). When anti-aliasing an object in the foreground the predicted background color can be used as a proxy for the actual background to select an algorithm for rendering the foreground object. Likewise, when blending a foreground graphical element to a background the predicted foreground transparency can be used as a proxy for rendering the foreground object. Other features, objects, and advantages of the invention will be apparent from the description and drawings, and from the claims.

DESCRIPTION OF DRAWINGS

FIG. 3 is a flow diagram illustrating a method 300 for rendering a foreground area of an electronic document.

Like reference symbols in the various drawings indicate like objects.

DETAILED DESCRIPTION

Figure 1:
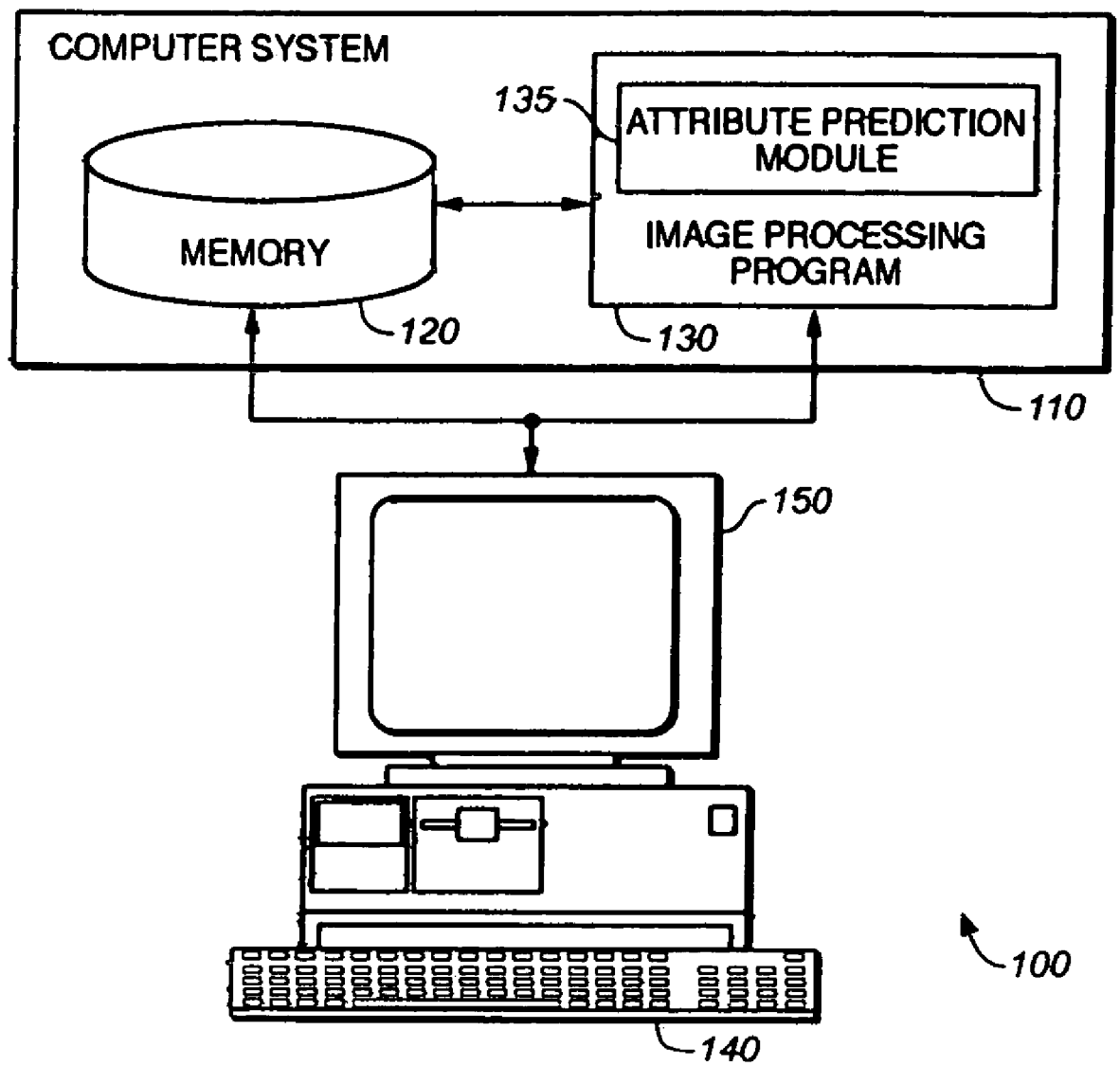
FIG. 1 is a block diagram illustrating an image processing system suitable for use in implementations of the present invention.

FIG. 1 illustrates an image processing system 100 that includes a general-purpose programmable digital computer system 110 of conventional construction, including a memory 120 and a processor for running an image processing program 130 that includes a target area attribute prediction module 135, which can be implemented, for example, in a conventional image-processing program such as Adobe Photoshop. Image processing system 100 also includes input devices 140, such as a keyboard, mouse or digitizing pen, and output devices such as a display monitor 150. Optionally, image processing system 100 also includes conventional communications hardware and software by which computer system 110 can be connected to other computer systems, such as over a network.

Figure 2:
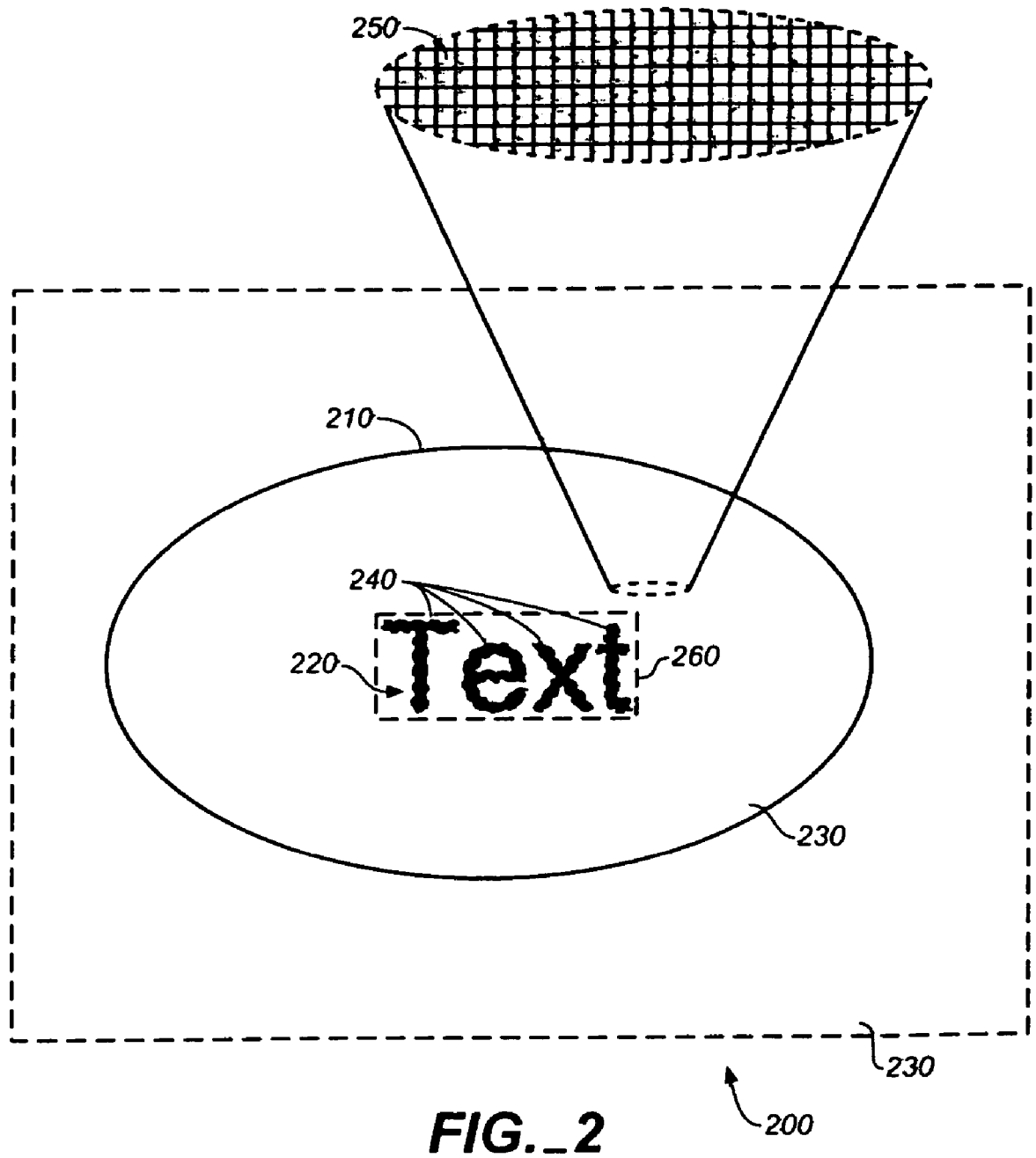
FIG. 2 illustrates a portion of a document including an image with a foreground area and a background.

FIG. 2 illustrates a portion of an image 200 generated in an image processing program 130 running on computer system 110. Image 200 can include multiple graphical objects such as differently colored text and/or non-text graphical objects, here including non-text object 210 and text object 220. When rendering object 220 (assuming that object 210 is rendered before object 220 in the painting order), object 220 is referred to as the foreground area 240 and object 210 becomes part of the background 230. Background 230 contains any objects in image 200 that were previously specified in the painting order. Background 230 and/or foreground area 240 can include a number of pixels 250 having a single color or many colors (e.g., defining a gradient or pattern). Portions of image 200 that contain text, however, will likely include primarily two colors—a background color and a text (or foreground) color. In some implementations, for these portions of the image, the background color can be used to select a rendering model or algorithm (e.g., an anti-aliasing algorithm) to be invoked when rendering foreground area 240 onto background 230.

FIG. 3 illustrates a general method 300 that can be performed by attribute prediction module 135 and image processing program 130 for sampling pixel attribute values of the foreground area and/or the background and rendering the foreground area based on the sampled pixel attribute values. Method 300 begins when a document is provided for output to a display or printer (step 310). The document can include an image 200 having a foreground area 240 and background 230. Next, a target area of foreground area 240 and/or background 230 is identified in the document (step 320). The target area can be a region in foreground area 240 or background area 230 that is associated with (e.g., overlaps) an object in the background or foreground, respectively. A set of pixels to sample is selected from each identified target area (step 330). Attribute values for one or more attributes of the pixels in each sample set are determined (step 340). The attributes can include color and/or transparency. Attribute prediction module 135 determines if there are more pixels in each sample set for which attribute values must be determined (step 350). Once attribute values have been determined for all or a sufficient subset of the pixels in the sample set, attribute prediction module 135 predicts the attribute value for the target area (step 360). Image processing program 130 composites (or renders) the foreground area and the background based on the predicted attribute value for the target area (step 370).

The set of pixels to sample includes less than all of the pixels in the target area. The sample size (e.g., number of pixels to be included in the sample set) can be specified by the user. The user can specify the sample size directly (e.g., by identifying a number of pixels or fraction of pixels in the target area to sample). The user can also specify the sample size indirectly, by, e.g., specifying a confidence level that is used in a statistical calculation such as the binomial distribution. When employing a statistical calculation, a target attribute value can be defined for comparison to the attribute value of the pixels in the sample set as will be explained in greater detail below. If it can be assumed that images are equally as likely to have a target attribute value as not and that the pixels in the sample set can be selected randomly and are not repeated (i.e. each pixel in the sample set either has the target value or does not), then the binomial distribution can be used. The statistical confidence level is defined as the probability, based on a set of measurements, that the actual probability of an event is better than some specified level. The specified level can be a predefined standard, or upper limit for the percentage of pixels in background 230 that do not match the target value. The sample size can also be determined by attribute prediction module 135, or can be predetermined (as in a default sample size). The sample size can be based on the total number of pixels contained in target area 260. For example, if target area 260 contains a total n number of pixels, then the sample size can be specified to be, e.g., half of the total number n of pixels, or n/2. In one implementation, a random number generator is used to select pixels of the sample set from target area 260. The random pixels can be selected by converting a number returned by a random number generator to an (x,y) coordinate in target area 260.

In a preferred implementation, attribute prediction module 135 can be used for predicting the background color when rendering a foreground area of an electronic document. In this implementation, target area 260 of background 230 includes the area associated with the text (or foreground area 240). Target area 260 can be a regular or irregular bounding area that contains all or a portion of the region in background 230 where text object 220 will be rendered. Target area 260 contains a number of pixels (e.g., pixels 250). Each pixel has a color value representing a color (which as used in this specification can include a gray scale value representing a shade of gray). Attribute prediction module 135 predicts the background color by sampling pixel color values in target area 260. To predict the background color, attribute prediction module 135 examines each pixel in the sample set (e.g., sequentially) to determine its color value. As mentioned above, when employing a statistical calculation, a target color can be defined for comparison to the color of the pixels in the sample set. In such a calculation, in some implementations, a pixel can match the target color if the pixel color value equals the target color value. In other implementations, the pixel's color value can fall within a predetermined range of the target color value and still be defined to match the target color value. For example, a selected pixel with a RGB value of <245,245, 245> can be defined based on a predetermined threshold to match a white target color which is represented by the value <255,255,255>.

In some implementations, it may not be necessary for attribute prediction module 135 to determine the color value of every pixel in the sample set as will be explained in greater detail below. Once color values have been determined for all or a sufficient subset of the pixels in the sample set, attribute prediction module 135 predicts the background color based upon the color values of the pixels in the sample set. For example, if each of the pixels in the sample set are determined to be of a white color, then the background color can be predicted to be of a white color.

Preferably, a statistical sampling analysis employing the binomial distribution is used to predict the background color (e.g., whether or not the background matches a target color), although other sampling methods can be used. When using the binomial distribution, the user can specify a confidence level and a predefined standard (or upper limit) for the percentage of pixels in background 230 that do not match a target color. For example, the user can specify a 95% confidence level and that background 230 is non-white if it contains more than 3% of non-white pixels.

From the binomial distribution, the number n of pixels to sample from the target area (or sample size) is given by:

$$n \geq z \times z \times \frac{(1-p)}{p} \quad \text{eq. 1}$$

where z is interval size associated with the standard error of the desired confidence level, and p is the predefined standard (or upper limit) for the percentage of pixels in the background that do not match a target color. Values for the interval size z associated with the standard error of confidence levels can be looked up in statistical textbooks (e.g., the z value associated with the 95% confidence level is approximately 1.65).

In the preceding example, the sample size is given by:

$$n \geq 1.65 \times 1.65 \times \frac{(1-.03)}{.03} \geq 88$$

Thus, the number of pixels needed to sample from target area 260 is at least 88 pixels for a 95% confidence level that background 230 contains more than 3% of non-white pixels. As mentioned above, the 88 pixels can be selected randomly from target area 260.

When predicting the background color using the binomial distribution, there is an uncertainty in the actual density of pixels that do not match the target color. The uncertainty u is calculated by:

$$u = \sqrt{p \times \frac{(1-p)}{n}} \quad \text{eq. 2}$$

Based on a desired confidence level for a binomial distribution, the background color can be assumed to not match the target color if:

$$n0 > [p+(z \times u)] \times n \quad \text{eq. 3}$$

where n0 is the total number of pixels in the sample set that have been determined not to match the target color in step 340. As mentioned above, it is not necessary to determine the color value for each of the total number of pixels in the sample set. Once the number of non-white pixels reaches an n0 value that satisfies the condition above (e.g., 6 in the example above), the background color can then be predicted. Likewise, if:

$$n0 > [p-(z \times u)] \times n \quad \text{eq. 4}$$

then the background color can be assumed to match the target color based on the desired confidence level with a density of non-matching pixels of p or less.

Continuing the example above:

$$n0 > \left[ .03 + \left( 1.65 \times \sqrt{.03 \times \frac{(1-.03)}{88}} \right) \right] \times 88 > 5.26$$

and $$n0 < \left[ .03 - \left( 1.65 \times \sqrt{.03 \times \frac{(1-.03)}{88}} \right) \right] \times 88 < 0$$

Thus, if there are 6 or more pixels in the sample set of the 88 pixels selected from target area 260 that are determined to be non-white, then with a 95% confidence level, background 230 can be assumed to contain more than 3% non-white pixels. Or, if each of the 88 pixels in the sample set are determined to be white, then with a 95% confidence level, background 230 can be assumed to contain less that 3% non-white pixels. Of the 88 pixels in the sample set, if the total number of pixels n0 that have been determined be non-white is between 0 and 6, then the number n0 is within the expected range of sampling results for a background that contains 3% non-white pixels, and the user can sample additional pixels until the conditions of equations (3) or (4) are satisfied, or until all of the pixels in the target area are examined. Alternatively, the user can define another confidence level and/or upper limit for the percentage of pixels in the background that do not match the target color in equations (3) and/or (4) and repeat method 300 for another iteration until the user is satisfied with the results of the prediction of the background color. For example, the user can specify an 88% confidence level and that the background 230 is non-white if it contains more than 10% non-white pixels, such that equation (4) solves as follows:

$$n0 < \left[ .10 - \left( 1.0 \times \sqrt{.10 \times \frac{(1-.10)}{88}} \right) \right] \times 88 < 6$$

Thus, as mentioned above, if there are 6 or more pixels in the sample set of the 88 pixels selected from target area 260 that are determined to be non-white, then with a 95% confidence level, background 230 can be assumed to contain more than 3% non-white pixels. However, if less than 6 pixels in the sample set are determined to be non-white, then with an 88% confidence level, background 230 can be assumed to contain less than 10% of non-white pixels.

The background color predicted by attribute prediction module 135 can be used in rendering the foreground object. In the example above, if it is predicted that the background is white, then image processing program 130 can, for example, select an anti-aliasing algorithm that pre-blends the edge pixels of the foreground object with white. If the background color is non-white, then a different anti-aliasing algorithm can be selected. Once the edge pixels of the foreground object have been pre-blended, then an opaque imaging model can be used and the foreground graphical object can be directly rendered onto the background 230.

Attribute prediction module 135 can also be used to predict the transparency (or alpha values) of a foreground area when rendering an image. If it is determined (within a specified confidence level as described in the color example above) that the foreground area is opaque, an opaque imaging model can be used for rendering at least the target area of the foreground area.

The invention can be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in specially-designed ASICs (application-specific integrated circuits).

A number of embodiments of the invention have been described. Nevertheless, it will be understood that various modifications may be made without departing from the spirit and scope of the invention. For example, the geometric distribution or Poisson distribution can be used in the statistical sampling methods described above. Heuristic sampling methods can be used. The predicted attribute values for the foreground area and/or background can be used in a blending mode function (e.g., a transfer mode function) when compositing (or rendering) the foreground area to the background. Accordingly, other embodiments are within the scope of the following claims.

What is claimed is:

1. A system comprising:
a programmable processor; and
a computer-readable medium comprising a computer product for rendering a foreground area of an image, the image including the foreground area and a background, the product comprising instructions operable to cause the programmable processor to:
identify a target area in the image, the target area being an area of the background associated with the foreground area or an area of the foreground area associated with an area of the background, the target area containing a number of pixels, each pixel having one or more attribute values associated with one or more attributes;
select a sample set of pixels to sample from the target area, the sample set of pixels including less than the number of pixels in the target area;
identify the attribute value of a first attribute for each of a plurality of the pixels in the sample set to identify a plurality of attribute values;
predict an attribute value of the first attribute for the target area based on the plurality of identified attribute values; and;
render at least a portion of the foreground area based on the predicted attribute value.

2. The system of claim 1, wherein: the one or more attributes include a color attribute.

3. The system of claim 1, wherein the instructions operable to cause the programmable processor to identify the attribute value include instructions operable to cause the programmable processor to:
determine whether the identified attribute value matches a predetermined attribute value.

4. The system of claim 3, wherein the instructions operable to cause the programmable processor to determine whether the identified attribute value matches a predetermined attribute value include instructions operable to cause the programmable processor to:
compare the attribute value of each the plurality of pixels to a set of attribute values within a threshold distance from the predetermined attribute value.

5. The system of claim 1, wherein the instructions operable to cause the programmable processor to select a sample set of pixels include instructions operable to cause the programmable processor to:
define a desired confidence level for the prediction of an attribute value for the pixels of one or more of the foreground area and the background.

6. The system of claim 5, wherein the instructions operable to cause the programmable processor to select a sample set of pixels include instructions operable to cause the programmable processor to:
define a sample size based on an allowable percentage of pixels that do not match the predetermined attribute value and the desired confidence level, and select a number of pixels from the target area based on the sample size.

7. The system of claim 6, wherein the instructions operable to cause the programmable processor to select a sample set of pixels include instructions operable to cause the programmable processor to:
randomly select the sample set of pixels from the target area.

8. The system of claim 1, wherein:
the one or more attributes include a transparency attribute.

9. The system of claim 2, wherein the instructions operable to cause the programmable processor to render the foreground area include instructions operable to cause the programmable processor to:
apply a rendering function based on the predicted attribute value.

10. The system of claim 9, wherein the instructions operable to cause the programmable processor to apply a rendering function include instructions operable to cause the programmable processor to:
select a rendering function from a plurality of rendering functions based on the predicted attribute value.

11. The system of claim 10, wherein:
the plurality of rendering functions includes a first rendering function for rendering foreground areas associated with background areas having a pre-determined attribute value; and
the computer product further comprises instructions operable to cause the programmable processor to apply the first rendering function if the predicted value matches the pre-determined attribute value.

12. The system of claim 11, wherein the instructions operable to cause the programmable processor to render the foreground area include instructions operable to cause the programmable processor to:
apply a second rendering function if the predicted value does not match the pre-determined attribute value.

13. A system comprising:
a programmable processor; and
a computer-readable medium comprising a computer product for rendering a foreground area of an image, the image including the foreground area and an associated background area, the background area including a number of pixels, the product comprising instructions operable to cause the programmable processor to:
select a set of pixels to sample from the background area, the selected set of pixels including less than the number of pixels in the background area;
identify a color of a plurality of pixels in the selected set;
predict a color of the background area based on the identified color;
based on the predicted color of the background area, select a rendering function from a plurality of rendering functions, the plurality of rendering functions including a first rendering function for rendering foreground areas associated with background areas having a pre-determined background color, and a second rendering function for rendering foreground areas not associated with background areas having the pre-determined background color; and
render at least a portion of the foreground area using the selected rendering function.

* * * * *

UNITED STATES PATENT AND TRADEMARK OFFICE
CERTIFICATE OF CORRECTION

PATENT NO. : 7,471,299 B2  Page 1 of 1
APPLICATION NO. : 11/479110
DATED : December 30, 2008
INVENTOR(S) : Craig D. Rublee It is certified that error appears in the above-identified patent and that said Letters Patent is hereby corrected as shown below:

On the Title Page, item (56), U.S. PATENT DOCUMENTS, add

| | | | |
|---|---|---|---|
| --5,630,037 | 05/1997 | Schindler, Keith W. | 345/592 |
| 6,246,791 | 06/2001 | Kurzweil et al. | 382/162 |
| 6,288,703 | 09/2001 | Berman et al. | 345/600 |
| 6,426,755 | 07/2002 | Deering, Michael F. | 345/581 |
| 6,128,000 | 10/2000 | Jouppi et al. | 345/614 |
| 6,411,744 | 06/2002 | Edwards, Jeffrey L. | 382/294 |
| 6,721,446 | 04/2004 | Wilensky et al. | 382/162 |
| 5,900,953 | 05/1999 | Bottou et al. | 358/540 |
| 5,687,303 | 11/1997 | Motamed et al. | 358/1.18 |
| 6,320,982 | 11/2001 | Kurzweil et al. | 382/173 |
| 6,360,023 | 03/2002 | Betrisey et al. | 382/260 |
| 6,225,973 | 05/2001 | Hill et al. | 345/589 |
| 2001/0048764 | 12/2001 | Betrisey et al. | 382/162 |
| 6,791,572 | 09/2004 | Hamburg, Mark | 345/619 |
| 6,532,022 | 03/2003 | Ahmad, Subutai | 345/629 |
| 6,587,583 | 07/2003 | Kurzweil et al. | 382/164 |
| 2004/0201753 | 10/2004 | Kondo et al. | 348/239 |
| 2001/0028735 | 10/2001 | Pettigrew et al. | 382/162-- |

Column 8, line 65, in claim 4, after "each", insert --of--.

Signed and Sealed this

Twentieth Day of October, 2009

David J. Kappos
*Director of the United States Patent and Trademark Office*